(12) United States Patent
Chen et al.

(10) Patent No.: US 10,049,538 B2
(45) Date of Patent: Aug. 14, 2018

(54) ELECTRONIC DEVICE INCLUDING HAPTIC ACTUATOR DRIVEN BASED UPON AUDIO NOISE AND MOTION AND RELATED METHODS

(71) Applicant: Apple Inc., Cupertino, CA (US)

(72) Inventors: Denis G. Chen, Cupertino, CA (US); Shingo Yoneoka, Sunnyvale, CA (US); Riccardo Tarelli, San Francisco, CA (US); Hari Vasudevan, San Jose, CA (US); Domenico Geria, San Francisco, CA (US); Mi Hye Shin, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/477,219

(22) Filed: Apr. 3, 2017

(65) Prior Publication Data
US 2018/0061192 A1     Mar. 1, 2018

Related U.S. Application Data

(60) Provisional application No. 62/381,947, filed on Aug. 31, 2016.

(51) Int. Cl.
*H04B 3/36* (2006.01)
*G08B 6/00* (2006.01)
(Continued)

(52) U.S. Cl.
CPC .............. *G08B 6/00* (2013.01); *G06F 3/016* (2013.01); *G10K 11/178* (2013.01); *H04R 19/04* (2013.01);
(Continued)

(58) Field of Classification Search
CPC .............. G08B 6/00; G06F 3/016; H04B 3/36
(Continued)

(56) References Cited

U.S. PATENT DOCUMENTS

| 8,169,402 | B2 | 5/2012 | Shahoian et al. |
| 8,914,453 | B2 * | 12/2014 | Dawar .................. G06F 1/1694 |
| | | | 455/550.1 |

(Continued)

FOREIGN PATENT DOCUMENTS

| CN | 104679233 | 6/2015 |
| CN | 105245722 | 1/2016 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Phung Nguyen
(74) *Attorney, Agent, or Firm* — Allen, Dyer, Doppelt + Gilchrist, P.A. Attorneys at Law (57) ABSTRACT

An electronic device may include a device housing and a haptic actuator carried by the device housing and that includes a haptic actuator housing and a field member movable within the haptic actuator housing. The electronic device may also include a motion sensor carried by the device housing to sense motion of the field member, an audio sensor carried by the device housing to sense audio noise from the haptic actuator, and a controller coupled to the haptic actuator, the motion sensor, and the audio sensor. The controller may be configured to drive the haptic actuator based upon sensed motion of the field member and audio noise from the haptic actuator.

23 Claims, 7 Drawing Sheets

(51) Int. Cl.
*G06F 3/01* (2006.01)
*G10K 11/178* (2006.01)
*H04R 19/04* (2006.01)

(52) U.S. Cl.
CPC ........... *G10K 2210/3028* (2013.01); *G10K 2210/3044* (2013.01); *H04R 2201/003* (2013.01); *H04R 2499/11* (2013.01)

(58) Field of Classification Search
USPC .................................. 340/407.1, 4.12, 7.6
See application file for complete search history.

(56) References Cited

U.S. PATENT DOCUMENTS

| | | | |
|---|---|---|---|
| 9,218,727 | B2 | 12/2015 | Rothkopf et al. |
| 9,846,485 | B2 * | 12/2017 | Birnbaum ............... G06F 3/016 |
| 2012/0086564 | A1 * | 4/2012 | Sinha ..................... H04M 1/23 |
| | | | 340/407.1 |
| 2014/0197936 | A1 | 7/2014 | Biggs et al. |
| 2015/0109223 | A1 | 4/2015 | Kessler et al. |
| 2015/0116205 | A1 | 4/2015 | Westerman et al. |
| 2015/0130730 | A1 * | 5/2015 | Harley ................... G06F 3/016 |
| | | | 345/173 |
| 2015/0187188 | A1 * | 7/2015 | Raskin .................... G08B 6/00 |
| | | | 340/407.1 |

FOREIGN PATENT DOCUMENTS

| | | |
|---|---|---|
| CN | 105592216 | 5/2016 |
| CN | 105812601 | 7/2016 |
| CN | 105847617 | 8/2016 |
| WO | 2013169299 A1 | 11/2013 |
| WO | 2013169303 A1 | 11/2013 |
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

ELECTRONIC DEVICE INCLUDING HAPTIC ACTUATOR DRIVEN BASED UPON AUDIO NOISE AND MOTION AND RELATED METHODS

RELATED APPLICATIONS

The present application claims the priority benefit of provisional application Ser. No. 62/381,947 filed on Aug. 31, 2016, the entire contents of which are herein incorporated in its entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a device housing and a haptic actuator carried by the device housing and that includes a haptic actuator housing and a field member movable within the haptic actuator housing. The electronic device may also include a motion sensor carried by the device housing to sense motion of the field member, an audio sensor carried by the device housing to sense audio noise from the haptic actuator, and a controller coupled to the haptic actuator, the motion sensor, and the audio sensor. The controller may be configured to drive the haptic actuator based upon sensed motion of the field member and audio noise from the haptic actuator.

The audio sensor may be carried within the haptic actuator housing directed toward the field member. The haptic actuator housing may have an opening therein, and the audio sensor may be carried by an exterior of the haptic actuator housing adjacent the opening, for example.

The motion sensor may be carried within the haptic actuator housing, for example. The audio sensor and the motion sensor may be carried in side-by-side relation, for example.

The controller may be configured to generate a drive signal for the haptic actuator, and adjust a magnitude of the drive signal based upon sensed motion of the field member and audio noise from the haptic actuator. The controller may be configured to generate a polarity inverted drive for the haptic actuator based upon sensed motion of the field member and audio noise from the haptic actuator, for example.

The controller may have signal filter parameters associated therewith for driving the haptic actuator, and the controller may be configured to adjust the signal filter parameters based upon sensed motion of the field member and audio noise from the haptic actuator. The controller may have a signal gain associated therewith for driving the haptic actuator, and the controller may be configured to adjust the signal gain based upon sensed motion of the field member and audio noise from the haptic actuator, for example.

The audio sensor may be configured to sense audio noise in an audible frequency range. The audio sensor may include a microelectromechanical (MEMS) audio sensor.

A method aspect is directed to a method of operating an electronic device that includes a device housing, a haptic actuator carried by the device housing and that includes a haptic actuator housing and a field member movable within the haptic actuator housing, a motion sensor carried by the device housing to sense motion of the field member, and an audio sensor carried by the device housing to sense audio noise from the haptic actuator. The method may include using a controller coupled to the haptic actuator, the motion sensor, and the audio sensor to drive the haptic actuator based upon sensed motion of the field member and audio noise from the haptic actuator.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
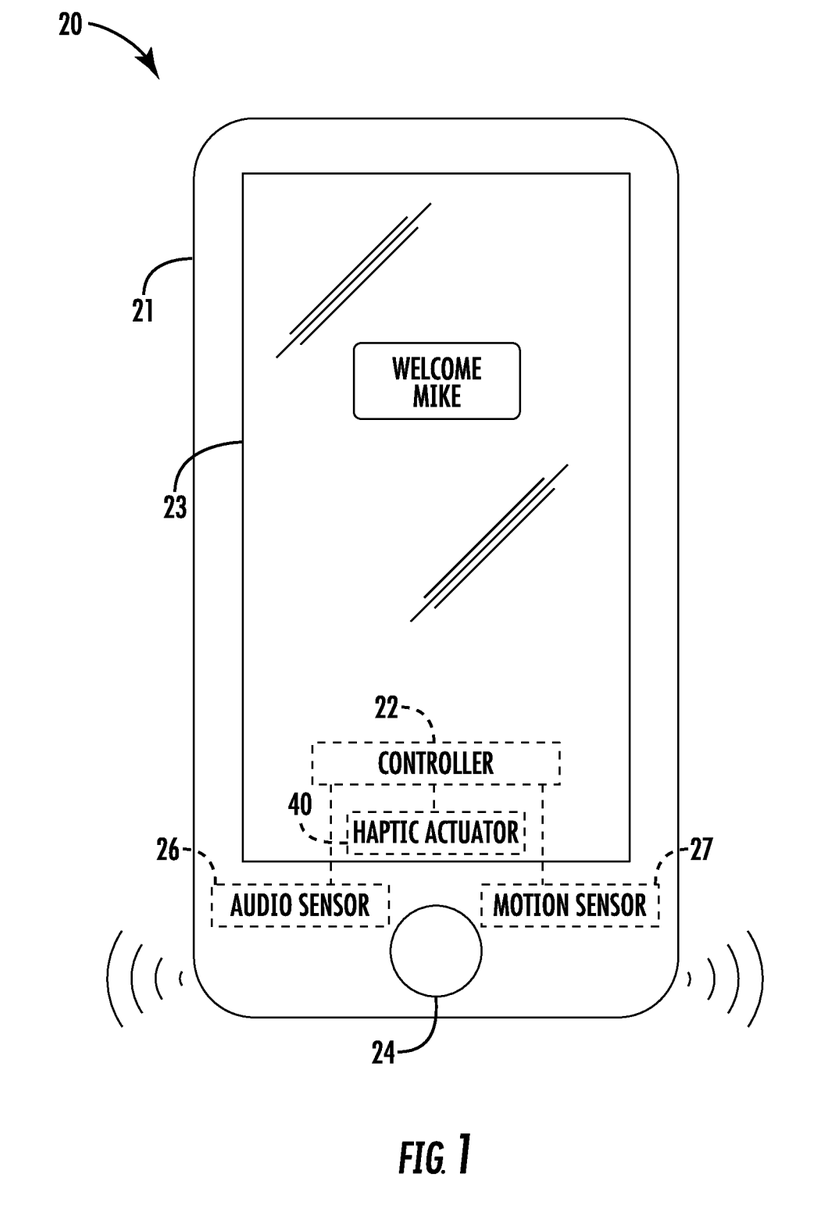
FIG. 1 is a perspective view of an electronic device including a haptic actuator according to an embodiment of the present invention.
Figure 2:
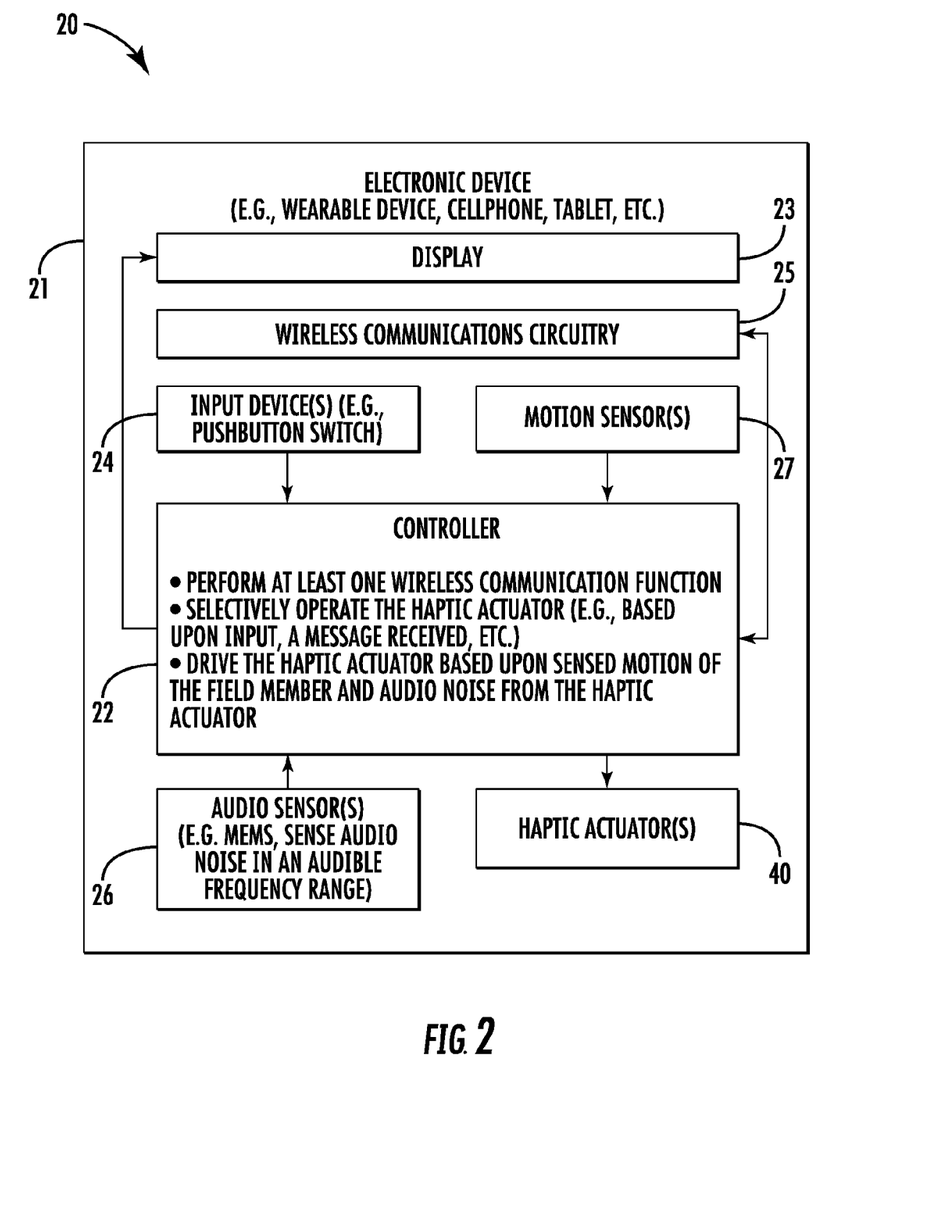
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a mobile telephone. The electronic device 20 may be another type of electronic device, for example, a wearable wireless communications device, and includes a band or strap for securing it to a user, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a light emitting diode (LED) display, for example, or may be another type of display, for example, a liquid crystal display (LCD) as will be appreciated by those skilled in the art.

A finger-operated user input device 24 illustratively in the form of a pushbutton switch is also carried by the device housing 21 and is coupled to the controller 22. The pushbutton switch 24 cooperates with the controller 22 to perform a device function in response to operation thereof. For example, a device function may include a powering on or off of the electronic device 20, initiating communication via the wireless communications circuitry 25, and/or performing a menu function. In some embodiments, the electronic device 20 may not include a pushbutton switch 24, as the finger-operated input device may be in another form, such as, for example, input from a touch display.

Figure 3:
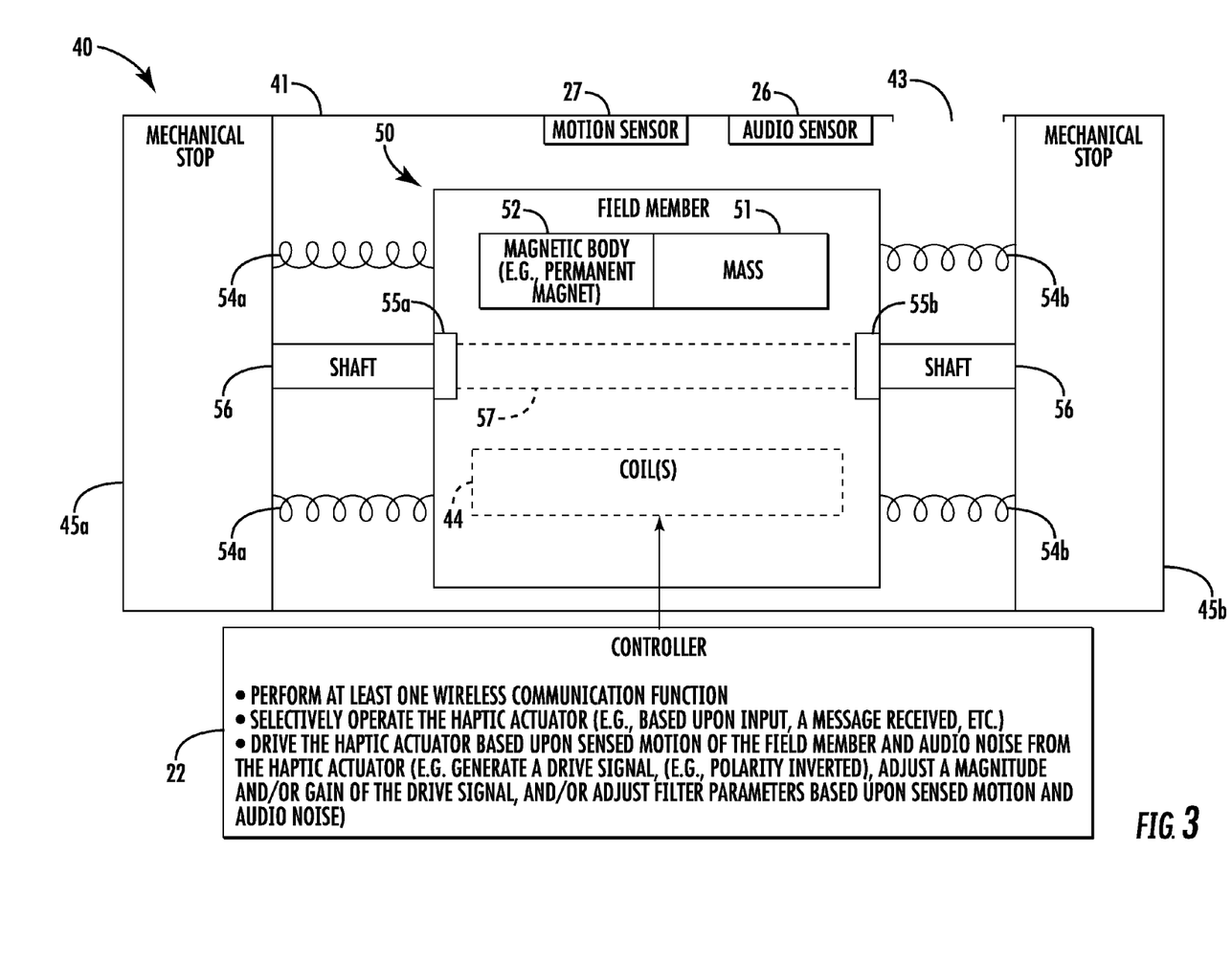
FIG. 3 is a more detailed schematic diagram of the haptic actuator of FIG. 1.

Referring now additionally to FIG. 3, the electronic device 20 illustratively includes a haptic actuator 40. The haptic actuator 40 is coupled to the controller 22 and determines user indications and operates the haptic actuator by way of applying power, current, or a voltage to a coil 44 to move a field member 50 based upon the user indication. More particularly, the haptic actuator 40 cooperates with the controller 22 to provide haptic feedback to the user. The haptic feedback may be in the form of relatively long and short vibrations or "taps", particularly, for example, when the electronic device 20 is in the form of a wearable device and the user is wearing the electronic device. The vibrations may be indicative of a message received, and the duration of the vibration may be indicative of the type of message received. Of course, the vibrations may be indicative of or convey other types of information.

While a controller 22 is described, it should be understood that the controller 22 may include one or more of a processor and other circuitry to perform the functions described herein, and some or all of the circuitry may be carried by an actuator housing and/or by the device housing 21.

Further details of the haptic actuator 40 are now described. The haptic actuator 40 includes an actuator housing 41. The coil 44 is carried by the actuator housing 41. Of course, there may be more than one coil carried by the housing 41.

The field member 50 is movable within the housing 41 responsive to the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses 51 and may be shaped for a particular application or operation. The field member 50 may also include one or more permanent magnets 52, i.e. magnetic bodies, cooperating with the coil 44 to provide movement of the field member 50. The field member 50 has a shaft receiving passageway 57 therein. In some embodiments, the field member 50 may include the coil 44, and the permanent magnets may be carried by the actuator housing 41.

The haptic actuator 40 also includes biasing members 54a, 54b between the actuator housing 41 and the field member 50. The biasing members 54a, 54b are illustratively in the form of springs for maintaining the field member suspended in the housing 41. The springs 54a, 54b may be mechanical springs, such as, for example, coil springs, leaf springs, and flexures. The springs 54a, 54b may also or additionally be magnetic springs that, through interaction with the permanent magnets and/or ferritic parts of the actuator housing 41, if any, store and amplify the energy in the form of elastic/magnetic energy.

Additionally, the haptic actuator 40 includes a pair of bearings within the shaft receiving passageway 57. A shaft 56 extends through the bearings 55a, 55b and is coupled to the actuator housing 41 to permit reciprocal movement of the field member 50 along the shaft and within the housing responsive to the coil 44. Other and/or additional components, such as shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom.

The haptic actuator 40 also includes mechanical limit stops 45a, 45b between the housing 41 and the field member 50. The mechanical limit stops 45a, 45b limit the movement of the field member to a desired range and/or stop the field member from crashing or banging into the housing 41. While mechanical stops 45a, 45b are described, it will be appreciated that the mechanical stops may be part of or a portion of the housing 41.

Typically, circuitry, for example, the controller 22, generates a sinusoidal drive waveform that drives the field member to move from an initial at-rest position. Driving of the haptic actuator 40 generates sound, for example, acoustic noise. The amount of sound generated by driving the haptic actuator 40 or movement of the field member 50 may be dependent on the orientation of the electronic device 20, how the user is holding the electronic device, and/or whether the electronic device is in a pocket, bag, etc. As will be appreciated by those skilled in the art, too much sound generated by the haptic actuator 40 may be undesirable to the user.

More particularly, the controller 22 may use factory-calibrated waveforms or drive signals to drive the haptic actuator 40. Over time, for example, as a result of normal wear and/or accidental events such as dropping, may cause electrical and/or mechanical properties of the haptic actuator 40 (e.g., Q-factor) to change such that the factory-calibrated waveform may be no longer "fit". Over or under-driving of the haptic actuator 40 may thus occur, which may lead to an increased number of failures. For example, when the Q-factor increases due to internal bearing wear/damage, vibration system damping reduces, and the pre-defined control or drive signal overdrives the haptic actuator 40 resulting in unwanted sounds or noises and/or collision of the field member 50 with the mechanical stops 45a, 45b. It should be appreciated by those skilled in the art that while a particular configuration of a haptic actuator including certain components is illustrated, other haptic actuator configurations may be used, which may include other and/or additional components in different configurations.

The electronic device 20 also includes an audio sensor 26 carried by the device housing 21, and more particularly, within the haptic actuator housing 41 directed to the field member 50 and adjacent an opening 43 in the haptic actuator housing. The audio sensor 26, i.e. audio input transducer or microphone, which may be in the form of a microelectromechanical (MEMS) audio sensor, is coupled to the controller 22 and senses audio noise in the audible frequency range, for example. There may be more than one audio sensor 26.

Figure 4:
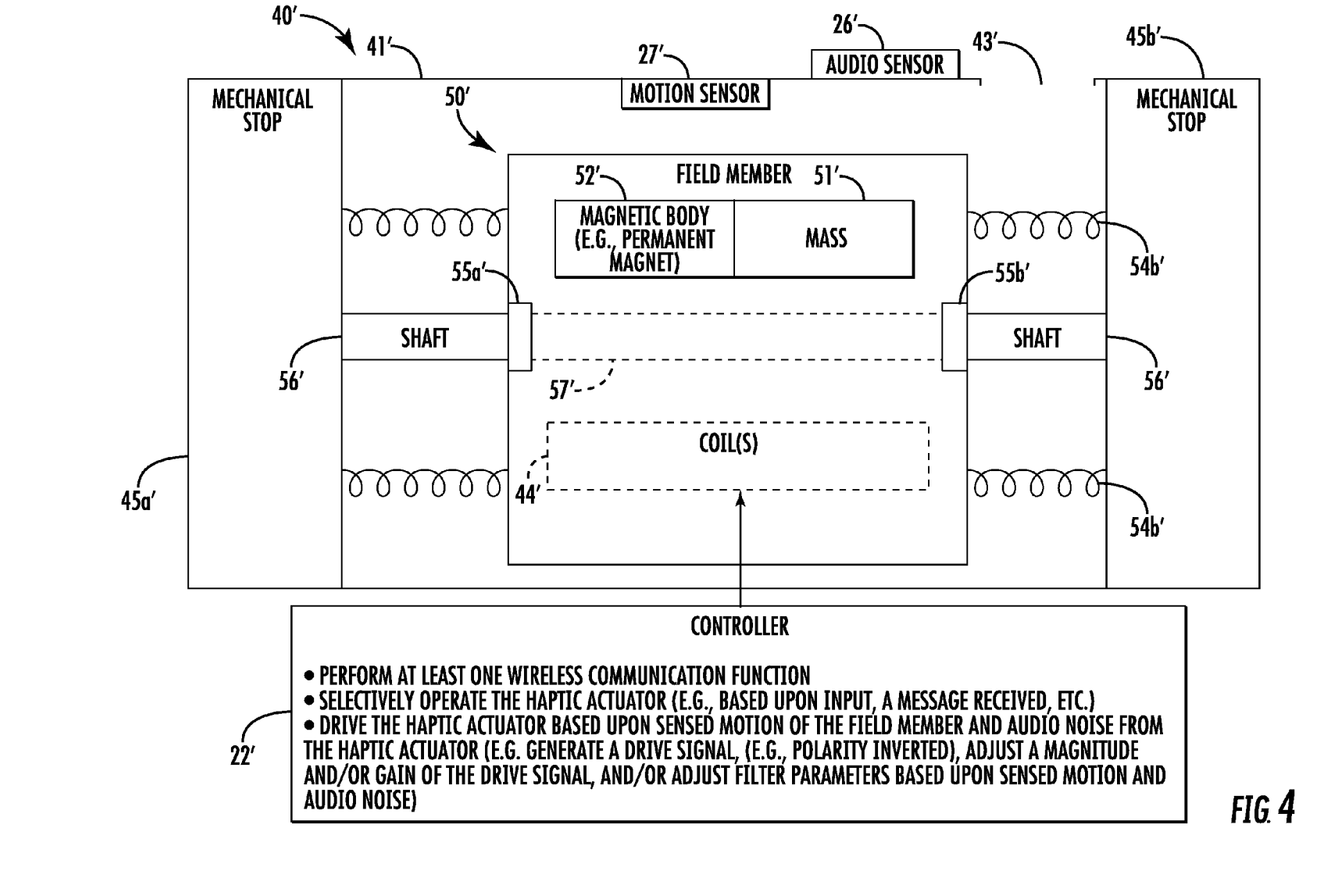
FIG. 4 is a detailed schematic diagram of a haptic actuator of an electronic device according to an embodiment.

The electronic device 20 also includes a motion sensor 27 that is carried within the haptic actuator housing 41 and adjacent the opening 43 in the haptic actuator housing. The motion sensor 27 may be a Hall Effect sensor or other magnetic sensor, an accelerometer, an optical sensor, or other device capable of sensing motion of the field member 50. Illustratively, the motion sensor 27 and the audio sensor 26 are in side-by-side relation. In some embodiments, the audio sensor 26 and the motion sensor 27 may be integrated into a single device housing, for example, or single integrated circuit (IC) device. There may be more than one motion sensor 27. Referring briefly to FIG. 4, in another embodiment, the audio sensor 26' may be carried by an exterior of the haptic actuator housing 41' adjacent the opening 43'.

Figure 5:
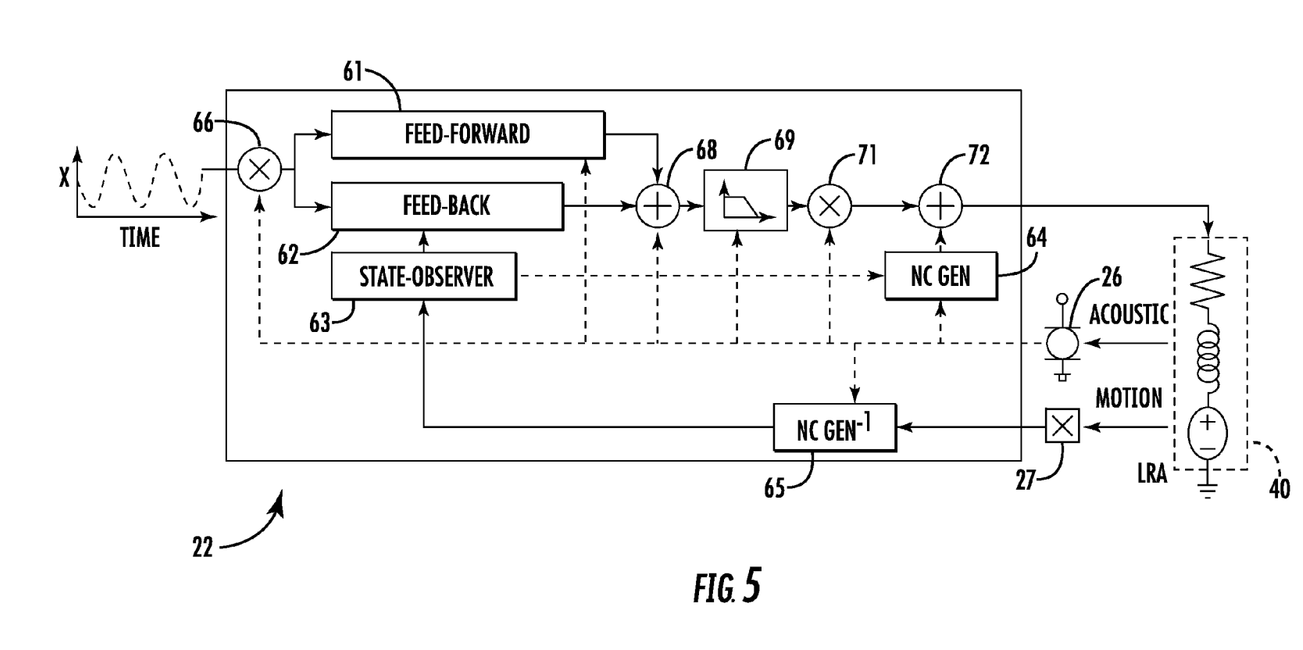
FIG. 5 is a schematic functional diagram of the controller of the electronic device of FIG. 2.

Referring now additionally to FIG. 5, to address increased sound levels that may occur over time, the controller 22 drives the haptic actuator based upon sensed motion of the field member 50 and noise from the haptic actuator 40. Operation of the controller 22 may conceptually be segmented into several modules: feed-forward 61, feed-back 62, state-observer 63, a noise cancellation generator 64, and an inverse noise cancellation generator 65. Sensed motion data from the motion sensor 27 and audio noise data from the audio sensor 26 are provided to the inverse noise cancellation generator 64 as an input. Audio noise from the audio sensor 26 is also provided as an input to the noise cancellation generator 64, a first multiplier 66, the feed-forward module 61, a first summing node 68, a filter module 69, and a second multiplier 71. The first summing node 68 sums outputs from the feed-forward and feed-back modules 61, 62. The first multiplier 66 also receives as an input the input signal representative of the drive signal. The filter module 69 receives the output of the first summing node 68. The output of the filter module 69 is provided as an input to the second multiplier 71. The output of the second multiplier 71 is provided to a second summing node 72 which receives its input from the noise cancellation generator 64. The noise cancellation generator 64 receives input from the state observer module 63 and the sensed audio noise data.

To drive the haptic actuator 40 based upon the sensed motion of the field member 50 and the noise from the haptic actuator 40, the controller 22 cooperates with the audio sensor 26 to sense if the haptic actuator 40 is generating noise, for example, above a threshold, or a noise level at which acoustic output of the haptic actuator may be deemed unpleasant to a user. The controller 22 may then use this acoustic feedback (i.e., audio noise from the haptic actuator 40) and the sensed motion of the field member 50 to adjust the magnitude of drive signal, adjust feed-forward module parameters, generate a polarity inverted signal to control output and/or the drive signal to cancel the noise generating signal component (i.e., active noise cancellation), adjust signal filter parameters, and/or adjust signal gain, for example.

More particularly, with reference to FIG. 5, for an active noise cancellation regime, the acoustic signal is input into the noise cancellation generator 64 to generate a polarity inverted signal. This noise cancellation generator 64 may include filters, state-observers, logic state-machines, etc. The noise cancellation generator 64 may be calibrated off-line to store output data, for example, in a lookup table, for cancelling a certain type and amount of acoustic noise. The noise cancellation generator 64 may also use motion data from the motion sensor 27 to optimize its output (e.g. use displacement to account for motor constant non-linearity).

The inverse noise cancellation generator 65 may be added to the motion sensing path to remove the noise cancelling part of actuator motion so the system may remain transparent to the controller 22. As will be appreciated by those skilled in the art, in practice, the audio sensor 26 and motion sensor 27 may be integrated in a single device. For example, a Hall Effect sensor and MEMS microphone can either be fabricated together in a hybrid CMOS-MEMS technology or be packaged together in a multi-chip package. Additionally, any mixed signal circuit for processing the output from these sensors can also be integrated in the same manner.

In an example, actuation bandwidth of the haptic actuator 40 in the x-direction is kept to below 300 Hz. Acoustic noise may be generated by a z-axis direction rocking mode at 540 Hz, for example. Thus, when the controller 22 drives the haptic actuator 40 at a 270 Hz vibe, the z-axis rocking mode is triggered and an audible noise at 540 Hz is generated. The controller 22, for example, via the noise cancellation generator module 64, generates a polarity inverted signal to move the haptic actuator 40 so that this 540 Hz noise is cancelled out or reduced. The controller 22 also attenuates the command magnitude so less noise is generated in the first place. The controller 22, for example, via the inverse noise cancellation generator module 65, is aware of the 540 Hz noise cancellation component in the drive signal and thus removes this from the motion estimation by either filtering out motion above 300 Hz or by direct feed-forward cancellation.

In the above example, some assumptions are made. First, z-mode noise can be cancelled out by x-mode actuation. In other words, there is underlying linearity in x and z coupling. Additionally, z-mode and x-mode, or any higher order mode sound alike at a given distance at a same frequency, and an acoustic wavefront originates from a point source model and is generally not dependent on orientation of mechanical excitation. Moreover, the audio sensor 26 basically acts as a volume displacement sensor sensitive to all orientations of mechanical excitation, while the motion sensor 27 only senses the x-mode.

A method aspect is directed to a method of operating an electronic device 20 that includes a device housing 21, a haptic actuator 40 carried by the device housing and that includes a haptic actuator housing 41 and a field member 50 movable within the haptic actuator housing, a motion sensor 27 carried by the device housing to sense motion of the field member, and an audio sensor 26 carried by the device housing to sense audio noise from the haptic actuator. The method includes using a controller 22 coupled to the haptic actuator 40, the motion sensor 27, and the audio sensor 26 to drive the haptic actuator based upon sensed motion of the field member 50 and audio noise from the haptic actuator.

Figure 6:
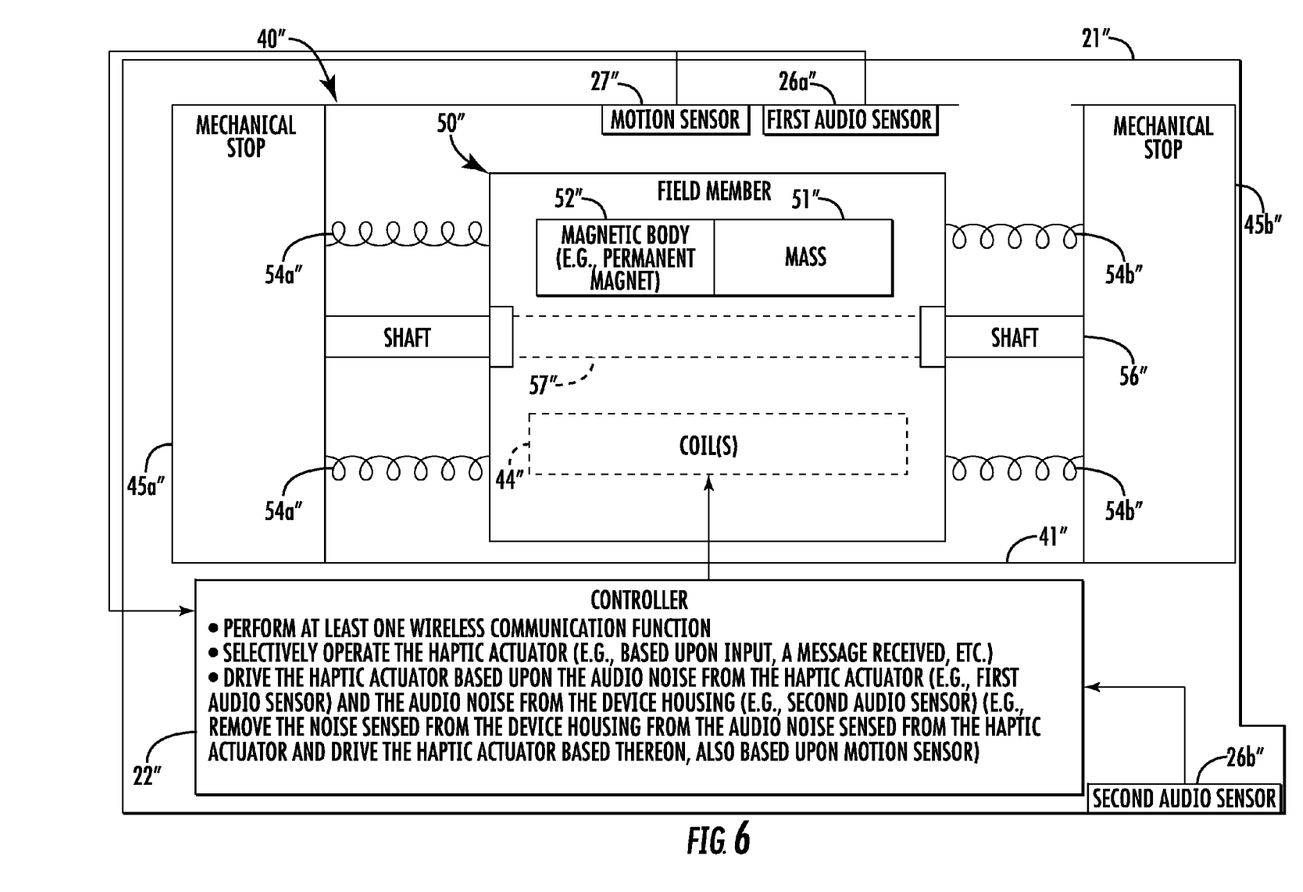
FIG. 6 is a detailed schematic diagram of a portion of an electronic device according to an embodiment.

Referring now to FIG. 6, in another embodiment, the electronic device 20" may include a first audio sensor 26a" carried within the haptic actuator housing 41". The first audio sensor 26a" may be of the type and configuration as described above and senses audio noise from the haptic actuator 40". The electronic device 20" also includes a second audio sensor 26b" that is carried within the device housing 21" and senses audio noise within the device housing. The second audio sensor 26b" may be of the type described above. The second audio senor 26b" may be carried by device motherboard, on a flexible substrate or circuit, or may be a reference audio sensor on module tester, for example.

A controller 22" is coupled to the haptic actuator 40", the first audio sensor 26a", and the second audio sensor 26b". The controller 22" drives the haptic actuator based upon the audio noise from the haptic actuator 40" (i.e., sensed from the first audio sensor 26a") and the audio noise from the device housing 21" (i.e., sensed from the second audio sensor 26b"). More particularly, the controller 22" removes the audio noise sensed from the device housing 21" from the audio noise sensed from the haptic actuator 40" and drives the haptic actuator 40" based thereon. In other words, the controller 22" subtracts the audio noise sensed from within the device housing 21" from the audio noise sensed from within the haptic actuator housing 41". Elements or components illustrated, but not specifically described in the present embodiment are similar to those described above and need no further discussion.

Figure 7:
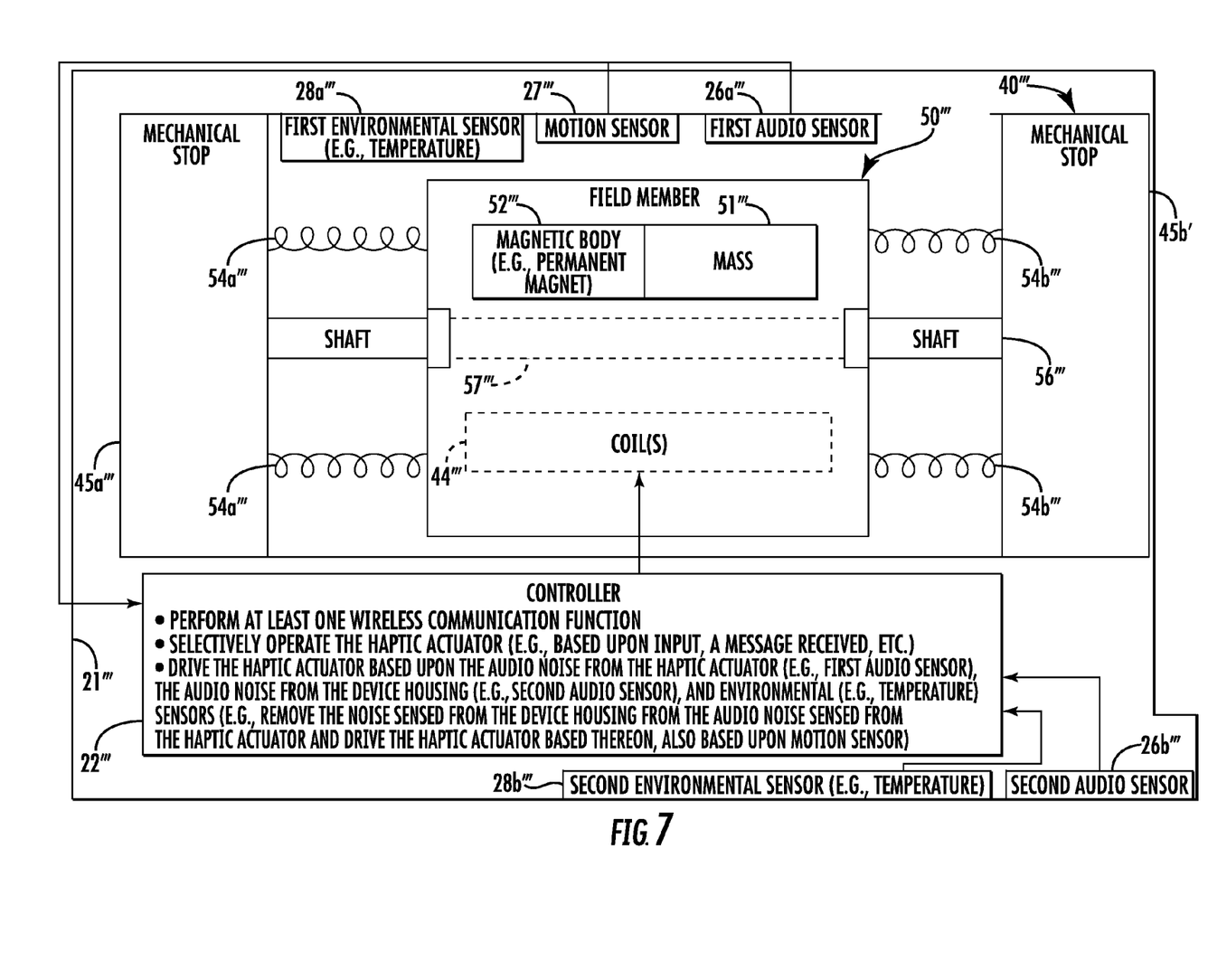
FIG. 7 is a detailed schematic diagram of a portion of an electronic device according to an embodiment.

Referring now to FIG. 7, in another embodiment, the electronic device 20''' illustratively includes a first environmental sensor 28a''' that is in the form of a temperature sensor carried within the haptic actuator housing 41''' and adjacent the first audio sensor 26a'''. There may be more than one first environmental sensor 28a''', and the first environmental sensor may not be adjacent the first audio sensor 26a'''. The first environmental sensor 28a''' may be another type of sensor, for example, a humidity sensor. The controller 22''' drives the haptic actuator 40''' also based upon the first environmental sensor 28a''', as will described in further detail below.

The electronic device 20''' also illustratively includes a second environmental sensor 28b''' that is also in the form of a temperature sensor carried within the device housing 21''' and adjacent the second audio sensor 26b'''. There may be more than one second environmental sensor 28b''', and the second environmental sensor may not be adjacent the second audio sensor 26b'''. The second environmental sensor 28b''' may be another type of sensor, for example, a humidity sensor. The controller 22''' drives the haptic actuator 40''' also based upon the second environmental sensor 28b''', as will described in further detail below.

In some embodiments, there may be multiple second environmental sensors defining what may be what be considered virtual sensors. For example, an array of second temperature sensors may be spaced apart within the device housing 21''' to obtain temperatures at different areas of the device housing. The controller 22''' may build a temperature profile so that a temperature at any given location within the device housing 21''' may be determined or estimated.

As will be appreciated by those skilled in the art, the electronic device 20''' uses both an internal microphone 26a''' (internal to the haptic actuator 40''') and also an external microphone 26b''' (external to the haptic actuator) to separate the acoustic noise from internal physical impact from the external background acoustic noise. The temperature sensors 28a''', 28b''' being relatively close to each of the first and second audio sensors 28a''', 28b''' may stabilize a respective thermal coefficient of each of the first and second audio sensors. Thus, the controller 22''' may use relatively accurate acoustic data to self regulate e.g. adjust drive level, frequency, and waveform vocabulary to reduce user detectable noise being emitted from the haptic actuator 40'''' against the background.

In operation, background noise sensed from the second audio sensor 26b''' carried within the device housing 21''' but outside the haptic actuator housing 41''', is passed through a filter that may mimic the acoustic transfer function of the device housing. The filtered signal is subtracted from the sensed audio noise from the first audio sensor 26a''' (i.e., the microphone internal to the haptic actuator housing 41'''). The acoustic transfer function of the device housing 21''' may be derived empirically either through modeling or offline calibration, for example. The sensed audio noise signal is fed into the controller 22''' to modify its drive signal. The temperature sensors 28a''', 28b''', which are relatively close to or adjacent to the first and second audio sensors 26a''', 26b''' may be used to improve temperature stability of the sensitivity of the first and second audio sensors.

As will be appreciated by those skilled in the art, temperature of the haptic actuator 40''' may deviate significantly from the rest of the electronic device 20''' within a relatively short amount of time. For example, with 2.65 W input, a haptic actuator temperature may rise more than 70° C. with a peak rate of 2.6° C./sec. Accordingly, temperature compensation or other environmental compensation may be desirable.

It should be understood that while specific embodiments have been described herein, the components from each of the different embodiments may be used together. For example, a motion sensor may be used with the environmental sensors and the controller may drive the haptic actuator based also upon the motion sensor. Moreover, while a particular arrangement of a haptic actuator is described and illustrated, it will be appreciated that the claimed embodiments are also applicable to other types of haptic actuators, for example, that may not include a shaft, have a reversed coil/permanent magnet arrangement, etc. Elements not specifically described in the present embodiment are similar to those described above and need no further discussion.

A method aspect is directed to a method of operating an electronic device 20" that includes a device housing 21", a haptic actuator 40" carried by the device housing and that includes a haptic actuator housing 41" and a field member 50" movable within the haptic actuator housing. The method includes using a first audio sensor 26a" carried within the haptic actuator housing 41" to sense audio noise from the haptic actuator and using a second audio sensor 26b" carried within the device housing 21" to sense audio noise within the device housing. The method also includes using a controller 22" coupled to the haptic actuator 40", the first audio sensor 26a", and the second audio sensor 26b" to drive the haptic actuator based upon the audio noise from the haptic actuator and the audio noise from the device housing 21".

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. An electronic device comprising:
a device housing;
a haptic actuator carried by the device housing and comprising a haptic actuator housing and a field member movable within the haptic actuator housing;
a motion sensor carried by the device housing configured to sense motion of the field member;
an audio sensor carried by the device housing configured to sense audio noise from the haptic actuator; and
a controller coupled to the haptic actuator, the motion sensor, and the audio sensor, the controller configured to drive the haptic actuator based upon sensed motion of the field member and audio noise from the haptic actuator.

2. The electronic device of claim 1 wherein the audio sensor is carried within the haptic actuator housing directed toward the field member.

3. The electronic device of claim 1 wherein the haptic actuator housing has an opening therein and wherein the audio sensor is carried by an exterior of the haptic actuator housing adjacent the opening.

4. The electronic device of claim 1 wherein the motion sensor is carried within the haptic actuator housing.

5. The electronic device of claim 1 wherein the audio sensor and the motion sensor are carried in side-by-side relation.

6. The electronic device of claim 1 wherein the controller is configured to generate a drive signal for the haptic actuator, and adjust a magnitude of the drive signal based upon sensed motion of the field member and audio noise from the haptic actuator.

7. The electronic device of claim 1 wherein the controller is configured to generate a polarity inverted drive signal for the haptic actuator based upon sensed motion of the field member and audio noise from the haptic actuator.

8. The electronic device of claim 1 wherein the controller has signal filter parameters associated therewith for driving the haptic actuator; and wherein the controller is configured to adjust the signal filter parameters based upon sensed motion of the field member and audio noise from the haptic actuator.

9. The electronic device of claim 1 wherein the controller has a signal gain associated therewith for driving the haptic actuator; and wherein the controller is configured to adjust the signal gain based upon sensed motion of the field member and audio noise from the haptic actuator.

10. The electronic device of claim 1 wherein the audio sensor is configured to sense audio noise in an audible frequency range.

11. The electronic device of claim 1 wherein the audio sensor comprises a microelectromechanical (MEMS) audio sensor.

12. An electronic device comprising:
a device housing;
a haptic actuator carried by the device housing and comprising a haptic actuator housing and a field member movable within the haptic actuator housing;
a motion sensor carried by the device housing configured to sense motion of the field member;
an audio sensor carried within the actuator housing directed toward the field member and configured to sense audio noise in an audible frequency range from the haptic actuator; and
a controller coupled to the haptic actuator, the motion sensor, and the audio sensor, the controller configured to drive the haptic actuator based upon sensed motion of the field member and audio noise from the haptic actuator.

13. The electronic device of claim 12 wherein the motion sensor is carried within the haptic actuator housing.

14. The electronic device of claim 12 wherein the audio sensor and the motion sensor are carried in side-by-side relation.

15. The electronic device of claim 12 wherein the controller is configured to generate a drive signal for the haptic actuator, and adjust a magnitude of the drive signal based upon sensed motion of the field member and audio noise from the haptic actuator.

16. The electronic device of claim 12 wherein the controller is configured to generate a polarity inverted drive signal for the haptic actuator based upon sensed motion of the field member and audio noise from the haptic actuator.

17. The electronic device of claim 12 wherein the controller has signal filter parameters associated therewith for driving the haptic actuator; and wherein the controller is configured to adjust the signal filter parameters based upon sensed motion of the field member and audio noise from the haptic actuator.

18. The electronic device of claim 12 wherein the controller has a signal gain associated therewith for driving the haptic actuator; and wherein the controller is configured to adjust the signal gain based upon sensed motion of the field member and audio noise from the haptic actuator.

19. A method of operating an electronic device comprising a device housing, a haptic actuator carried by the device housing and comprising a haptic actuator housing and a field member movable within the haptic actuator housing, a motion sensor carried by the device housing to sense motion of the field member, and an audio sensor carried by the device housing to sense audio noise from the haptic actuator, the method comprising:
using a controller coupled to the haptic actuator, the motion sensor, and the audio sensor to drive the haptic actuator based upon sensed motion of the field member and audio noise from the haptic actuator.

20. The method of claim 19 wherein the controller is used to generate a drive signal for the haptic actuator, and adjust a magnitude of the drive signal based upon sensed motion of the field member and audio noise from the haptic actuator.

21. The method of claim 19 wherein the controller is used to generate a polarity inverted drive signal for the haptic actuator based upon sensed motion of the field member and audio noise from the haptic actuator.

22. The method of claim 19 wherein the controller has signal filter parameters associated therewith for driving the haptic actuator; and wherein the controller is used to adjust the signal filter parameters based upon sensed motion of the field member and audio noise from the haptic actuator.

23. The method of claim 19 wherein the controller has a signal gain associated therewith for driving the haptic actuator; and wherein the controller is used to adjust the signal gain based upon sensed motion of the field member and audio noise from the haptic actuator.

* * * * *